Patented May 29, 1951

2,555,282

UNITED STATES PATENT OFFICE 2,555,282

PRODUCTION OF MICROSPHEROIDAL GEL CATALYST BY SPRAY DRYING

Kenneth D. Ashley, Stamford, Conn., assignor to American Cyanamid Company, New York, N. Y., a corporation of Maine No Drawing. Application December 14, 1949, Serial No. 132,982

4 Claims. (Cl. 252—448)

This invention relates to the production of catalysts composed of inorganic oxide gels including a major proportion of silica gel and a minor proportion of one or more activating metal oxides, in the form of small, rounded particles or pellets having the size distribution requisite for use in the fluid stream cracking process.

Silica catalysts containing relatively minor proportions of activating metal oxides are in wide commercial use for the catalytic cracking of petroleum fractions. The principal catalysts of this type that are used for the manufacture of gasoline are the silica-alumina catalysts, which usually contain from about 65% to about 95% of silica and about 35% to 5% of alumina, the silica-magnesia catalysts which may contain from about 2–40% of magnesium oxide, the balance being substantially all silica, and the silica-alumina-magnesia catalysts. In the latter class the alumina is usually present in small quantities on the order of 1%, 2%, 3%, or four or five percent; the magnesia content is usually within the range of about 10–40% and preferably about 25–30% and the balance is substantially all silica.

In preparing silica gel catalysts of the above type the art has employed two general methods: either the formation of a silica precipitate or the formation of a silica gel. In the first of these two methods a sodium silicate solution is acidified by the addition of acid with vigorous agitation, the conditions being such that a two-phase aqueous suspension of grains of gelatinous silica is formed. This suspension is then treated to incorporate the desired quantities of alumina, magnesia or other activating metal oxide, usually with filtration and washing to remove undesired alkali metal salts, and the gelatinous particles of catalyst are hardened and dehydrated by heat. In the second method the concentration, proportion and order of addition of the reagents are such as to produce a gel directly, or to form a sol which rapidly hardens into a gel. This gel may be broken into pieces and washed to remove alkali metal salts, or a preformed gel may be produced by dropping the sol into an oil bath in order to form rounded gel particles which can be washed and dried to produce the finished catalyst.

The present invention is directed to a method for the production of catalysts of the dried gel type, as distinguished from the silica precipitate type, in the form of small rounded microspheres having a particle size such as to be of optimum utility in the fluid stream cracking process. Current requirements of this process call for a catalyst having an average particle size of at least 40 to 55 microns and in which about 98–100% will pass through a 100 mesh Tyler screen, at least 85% will pass through a 200 mesh screen and not over 5% of the catalyst is smaller than 10 microns in diameter. The problem of producing rounded grains of heat-hardened gel catalyst having the above particle size distribution is solved by the present invention.

The opinion of many petroleum experts is that cracking catalysts of the hardened gel type, as distinguished from those of the precipitate type, have considerably higher cracking activity and will give higher yields of motor gasoline and also a base stock of higher octane number. However, it has been considered necessary to use the hardened gel catalysts in the form of relatively large pellets, having an average diameter of 1 mm. or greater, either in a fixed bed or in a moving bed cracking process. This opinion was held because the practical difficulties in the way of producing a hardened gel type promoted silica catalyst substantially free from alkali metal salts (i. e., containing a maximum of about 0.1% and preferably not more than 0.05% of $Na_2O$) in the form of very small microspheres were such that this type of catalyst is not available in commercial quantities at the present time.

As has been indicated, it is a principal object of the present invention to provide a commercially feasible method for the production of heat hardened microspheroidal silica gel catalysts in the large quantities necessary for present day cracking requirements. A further object resides in the production of catalysts of this class which are substantially free from alkali metal salts and which therefore retain their activity during repeated cycles of cracking and regeneration in the fluid stream cracking process. Still further objects will become apparent from the following description of preferred embodiments of the invention, when taken with the appended claims.

My invention is based on the concept of first preparing a ground hydrous gel composed of a major proportion of silica together with a smaller quantity of an alumina, magnesia or magnesia-alumina promoter, the extent of grinding being such that a finished catalyst of the desired particle size distribution will be obtained, and subjecting an aqueous dispersion of this ground gel to a more or less conventional spray drying procedure. In order to obtain a catalyst substantially free from alkali metal salts the gel may be washed by filtration or by decantation washing, and this may be accomplished either before or after the alumina or magnesia promoter has been incorporated into the silica gel. Although in some cases the gel may be washed after grinding, I greatly prefer to complete the removal of alkali metal compounds before the gel is ground, in order to avoid the difficulties in filtering or setting a gel suspension of fine particle size. After the gel suspension has been so prepared it is injected into a stream of hot gases and the water forming the continuous phase is evaporated rapidly, the sensible heat of the hot gases also causing the small gel particles to become partially or completely dried and thus producing the finished catalyst.

Experience has shown that a dried gel catalyst having a moisture content below 20%, and usually not more than about 15%, can be obtained by spraying an aqueous silica gel slurry of the above type into hot gases having a temperature above 600° F. and preferably about 700°–1000° F. while maintaining a contact time between the gases and catalyst of about 5 seconds or less. This can be accomplished by spraying an aqueous dispersion of the ground catalyst gel containing from about 4% to about 8–10% solids into the top of a cylindrical spray drying chamber having a diameter of about 20–30 feet and a height approximately equal to its diameter, this chamber being supplied with about 20,000–30,000 cubic feet of hot gases per minute. Preferably the slurry is dispersed into the upper part of the chamber by pouring or dropping it onto a rotating vaned spray wheel of conventional design, the hot gases being introduced in a descending spiral that surrounds the spray wheel. When these conditions are observed the finished catalyst consists of dried particles having a high degree of sphericity, and also a highly uniform particle size.

In order to obtain a dried microspheroidal catalyst in which substantially all will pass through a 100 mesh screen but in which the content of fines is held at a minimum, the grinding process must be carefully controlled. I have found that, although a wide variety of grinding machines may be employed, the particle size distribution of the wet ground gel should be carefully controlled. Optimum results are obtained when at least 95% by weight of the wet gel will pass through a 30 mesh screen and at least 50% will pass through an 80 mesh screen, while at least about 50% of the wet gel is retained on a 300 mesh screen. This degree of grinding can be obtained by using a Patterson mixer operating at 160–330 R. P. M., or by employing a ball mill or a Lancaster disperser or any other equivalent mechanical grinding device.

It will thus be seen that my invention consists generally in the steps of first forming a gel composed of silica, or of silica-alumina, silica-magnesia or silica-alumina-magnesia having the percentage composition outlined above; then grinding the gel in water dispersion to obtain small particles having a size larger than that desired in the finished catalyst but corresponding generally thereto, and then introducing a two-phase aqueous slurry of this ground gel into a stream of hot gases and maintaining the particles suspended in the gas stream while the free water of suspension is evaporated and the gel particles are dried to a water content of less than 20%. By operating in this manner a positive control of the particle size of the gel is maintained at all times; i. e., the initially large pieces of the catalyst gel are reduced by grinding to exactly the size and shape needed to produce a finished microspheroidal catalyst of the desired sphericity and particle size distribution and the injection of the slurry into a spray drying chamber is simply for the purpose of removing moisture and forming a heat-hardened product. Moreover, by this procedure the spray drying process is greatly facilitated, for most of the water removed therein comes from the continuous phase of a two-phase slurry, and need not be extracted from a hydrogel. This is in marked distinction from those instances in the prior art where attempts have been made to spray dry a gel consisting of a single phase; in such attempts there has been no control whatsoever over the particle size of the finished process and the spray drying process itself has been one of extracting adsorbed water from a gel or hydrogel.

The invention will be further illustrated by the following specific examples. It should be understood, however, that although these examples may describe in detail certain preferred embodiments of the invention, they are given primarily for purposes of illustration and the invention in its broader aspects is not limited thereto.

*Example 1*

A sodium silicate solution was prepared by adding 850 lbs. of water to 1150 lbs. of a commercial waterglass containing 29% $SiO_2$ and 9% $Na_2O$.

A charge of 180 lbs. of concentrated sulfuric acid was diluted with 3460 lbs. of water.

The sodium silicate solution was added to the dilute sulfuric acid over a 20 minute period with strong agitation until a final pH of 5.2 was attained. The strong agitation was then stopped, whereupon gelation started immediately. A gate agitator operating at 22 R. P. M. was started and an additional 13% of water was added to fluidize the resultant gel slurry.

An alum solution, prepared by dissolving 290 lbs. of aluminum sulfate (16.6% $Al_2O_3$) in 650 lbs. of water was added over 10 minutes with continued gate agitation. Sufficient ammonia (160 lbs. of 29% $NH_4OH$ solution in 700 lbs. of water) was then added over a 30 minute period to bring the pH to 5.7. By this procedure there was formed an aqueous slurry of small pieces of a silica-alumina catalyst gel containing, on the dry basis, approximately 13% of alumina and 87% of silica.

The gel slurry was transferred to a wash tank, diluted with twice its volume of water with vigorous air agitation and allowed to settle for 20 minutes. The supernatant water was then drawn off and discarded. This process was repeated for a total of five times in order to ensure the production of a final dried catalyst containing less than 0.1% $Na_2O$. After the final decantation of wash water the slurry was made up to 5.4% solids by adding pure water. One portion of this gel slurry was spray dried without grinding. Other portions were ground to different degrees of fineness and were then spray dried under the same conditions; i. e., with a chamber inlet temperature of 600° F. and using an atomizing wheel rotating at 10,000 R. P. M.

The ground catalyst gel slurries and the corresponding dried catalysts were examined for particle size distribution by a screen analysis. The results were as follows:

|   |   | −40 | −80 | −100 | −200 | −300 | 20μ | 10μ |
|---|---|---|---|---|---|---|---|---|
| WET SCREEN ANALYSIS OF GEL SLURRY ||||||||||
| 2 | Coarse grinding | 95 | 50 | 40 | 35 | 20 | | |
| 3 | Fine grinding | 100 | 95 | 86 | 60 | 52 | | |
| SCREEN ANALYSIS OF DRIED CATALYST ||||||||||
| 1 | Unground | 96 | 91 | 84 | 72 | 28 | 0 | 0 |
| 2 | Coarse grinding | 100 | 100 | 98 | 85 | 32 | 2 | 0 |
| 3 | Fine grinding | 100 | 100 | 100 | 92 | 50 | 19 | 5 |

Samples of the dried catalyst were also examined under the microscope. It was found that practically all of the larger particles and many of the small grains of catalyst No. 1, prepared from the unground gel, were irregular in shape and contained corners and projections that would be ground off during use in the fluid stream process with the production of a high proportion of fines. In catalyst No. 2 the proportion of irregularly shaped particles was relatively small, and in catalyst No. 3 there were practically no particles of irregular shape. This shows clearly the important advantages obtained by grinding a wet gel catalyst prior to spray drying.

*Example 2*

A silica gel slurry was prepared by adding 115 lbs. of sodium silicate in 83 lbs. of water to 18 lbs. of sulfuric acid in 346 lbs. of water by the procedure described in Example 1. To this slurry there was added a solution of 9 lbs. of aluminum sulfate (16.6% $Al_2O_3$) in 20 lbs. of water and then after 10 minutes mild agitation, a solution of 5 lbs. of 29% ammonium hydroxide in 21 lbs. of water was added to bring the final pH to 5.8 and precipitate the alumina uniformly throughout the silica gel. The gel slurry was then washed repeatedly until the content of alkali metal salts was below 0.1% based on the dry weight of the silica-alumina after which it was ground in a Lancaster disperser until a sample showed, on wet screen analysis, 100% through 40 mesh, 96% through 80 mesh, 88% through 100 mesh and 66% through 200 mesh.

The ground gel was diluted with water to a slurry of 4% solids and was agitated while 14.16 lbs. of finely ground and pulverized magnesium oxide were slowly added. The agitation was continued for an additional 30 minutes after which the slurry was introduced into a spray drying chamber and dried with an inlet hot gas temperature of 650° F. and a spray wheel speed of 10,000 R. P. M. The product was a silica-magnesia-alumina catalyst of less than 15% moisture content in which all the particles were well-rounded in shape and would pass through a 100 mesh screen, 95% through 200 mesh, 50% through 300 mesh, and not more than 5% were smaller than 5 microns in size.

*Example 3*

A silica gel was prepared from 115 lbs. of sodium silicate and 18 lbs. of sulfuric acid in the dilutions and by the procedure described in Example 2. This gel was suspended in an additional 10% of water and agitated to break it into a water slurry suitable for washing and grinding. The gel slurry was then diluted with three times its volume of pure water, agitated thoroughly and allowed to stand for 20 minutes, after which the supernatant liquid was decanted. This washing procedure was repeated for a total of six times, in order to obtain an $Na_2O$ content of less than 0.1% in the dried gel. The gel was then ground until a sample showed approximately the same particle size distribution as in Example 2.

To the ground gel slurry, having a solids content of 5.2%, there was added with agitation a solution of 29 lbs. of aluminum sulfate in 65 lbs. of water followed by sufficient ammonium hydroxide to precipitate all the alumina and raise the pH to 5.7. The gel was filtered and washed to remove ammonium sulfate. The resulting silica-alumina gel slurry was then spray dried as described in the preceding examples. The product was comparable in all respects, including particle size distribution and sphericity, to catalyst No. 3 of Example 1.

What I claim is:

1. A method of producing a dried silica gel type catalyst in the form of regular spheroids of predetermined particle size which comprises preparing a ground hydrous gel composed of a major proportion of hydrated silica together with a minor quantity of a member of the group consisting of hydrated alumina, hydrated magnesia and hydrated magnesia and alumina, the extent of grinding being such that after it is completed at least 95% by weight of the wet gel will pass through a 30 mesh screen and at least 50% will pass through an 80 mesh screen while at least 50% will be retained on a 300 mesh screen, and then dispersing a 4–10% aqueous suspension of said ground catalyst gel into a current of hot gases having an inlet temperature of 600–1000° F. and maintaining it suspended in said gases while the free water of the suspension is evaporated and the ground gel particles are dried to a water content of less than 20%.

2. A method of producing a dried silica gel type catalyst substantially free from alkali metal salts and having the form of regular spheroids of predetermined particle size distribution which comprises the steps of preparing a set hydrous gel composed of a major proportion of hydrated silica together with a minor quantity of a member of the group consisting of hydrated alumina, hydrated magnesia and hydrated magnesia and alumina, washing said gel with water until the alkali metal salt content thereof is less than 0.1% $Na_2O$ on the dry basis, grinding said gel until at least 95% by weight thereof will pass through a 30 mesh screen and at least 50% will pass through an 80 mesh screen while at least 50% will be retained on a 300 mesh screen, and then dispersing a 4–10% aqueous suspension of said ground catalyst gel into a current of hot gases having an inlet temperature of 600–1000° F. and maintaining it suspended in said gases while the free water of the suspension is evaporated and the ground gel particles are dried to a water content of less than 20%.

3. A method of producing a dried silica gel type catalyst substantially free from alkali metal salts and having the form of regular spheroids of predetermined particle size distribution which comprises the steps of preparing a set hydrous gel composed of hydrated silica, washing said gel with water until the alkali metal salt content thereof is less than 0.1% $Na_2O$ on the dry basis, grinding said gel until at least 95% by weight thereof will pass through a 30 mesh screen and at least 50% will pass through an 80 mesh screen while at least 50% will be retained on a 300 mesh screen, impregnating said gel with a minor quantity of a member of the group consisting of hydrated alumina, hydrated magnesia and hydrated magnesia and alumina, and then dispersing a 4-10% aqueous suspension of said ground and impregnated catalyst gel into a current of hot gases having an inlet temperature of 600-1000° F. and maintaining it suspended in said gases while the free water of the suspension is evaporated and the ground gel particles are dried to a water content of less than 20%.

4. A method of producing a dried silica gel type catalyst substantially free from alkali metal salts and having the form of regular spheroids of predetermined particle size distribution which comprises the steps of preparing a set hydrous gel composed of hydrated silica, washing said gel with water until the alkali metal salt content thereof is less than 0.1% $Na_2O$ on the dry basis, impregnating said gel with a minor quantity of a member of the group consisting of hydrated alumina, hydrated magnesia and hydrated magnesia and alumina, grinding said gel until at least 95% by weight thereof will pass through a 30 mesh screen and at least 50% will pass through an 80 mesh screen while at least 50% will be retained on a 300 mesh screen, and then dispersing a 4-10% aqueous suspension of said ground catalyst gel into a current of hot gases having an inlet temperature of 600-1000° F. and maintaining it suspended in said gases while the free water of the suspension is evaporated and the ground gel particles are dried to a water content of less than 20%.

KENNETH D. ASHLEY.

REFERENCES CITED

The following references are of record in the file of this patent:

UNITED STATES PATENTS

| Number | Name | Date |
| --- | --- | --- |
| 2,435,158 | Read | Jan. 27, 1948 |
| 2,457,970 | Bailie | Jan. 4, 1949 |